United States Patent

[11] 3,595,270

| [72] | Inventor | Daniel R. McNeal, Jr. |
| --- | --- | --- |
| | | Gwynedd, Pa. |
| [21] | Appl. No. | 4,297 |
| [22] | Filed | Jan. 20, 1970 |
| [45] | Patented | July 27, 1971 |
| [73] | Assignee | Andale Company |
| | | Lansdale, Pa. |

[54] PLUG VALVE CONSTRUCTION AND OPERATING MECHANISM
15 Claims, 9 Drawing Figs.

[52] U.S. Cl. .................................................. 137/595, 251/161, 251/192
[51] Int. Cl. ................................................ F16k 11/14, F16k 5/16
[50] Field of Search .......................................... 137/595; 251/158, 161, 164, 188, 187, 192

[56] References Cited
UNITED STATES PATENTS

| 1,270,722 | 6/1918 | Gillette | 137/595 |
| 1,520,233 | 12/1924 | Gabriel | 137/595 |
| 3,049,333 | 8/1962 | Wright et al. | 251/158 |
| 3,130,951 | 4/1964 | Smith | 251/158 |
| 3,394,735 | 7/1968 | Wurster | 251/161 X |

*Primary Examiner*—Henry T. Klinksiek
*Attorney*—Synnestvedt & Lechner

ABSTRACT: A duplex or double plug valve arrangement having two tapered valve plugs positioned on a common axis and adapted to seat in tapered valve cavities by axial movement in opposite directions. Each valve cavity is provided with three valve ports, two being positioned diametrically opposite to each other and the third midway between the first two. Valve seating mechanism is provided including means reacting against each valve plug to effect seating of the other valve plug. The port and the valve passage in at least one of the valve plugs are of the same circular cross section, such valve passage being in the form of the passage in a 90° pipe bend.

INVENTOR.
DANIEL R. McNEAL, JR.
BY
ATTORNEYS

INVENTOR
DANIEL R. McNEAL, JR.
ATTORNEYS

INVENTOR.
DANIEL R. McNEAL, JR.

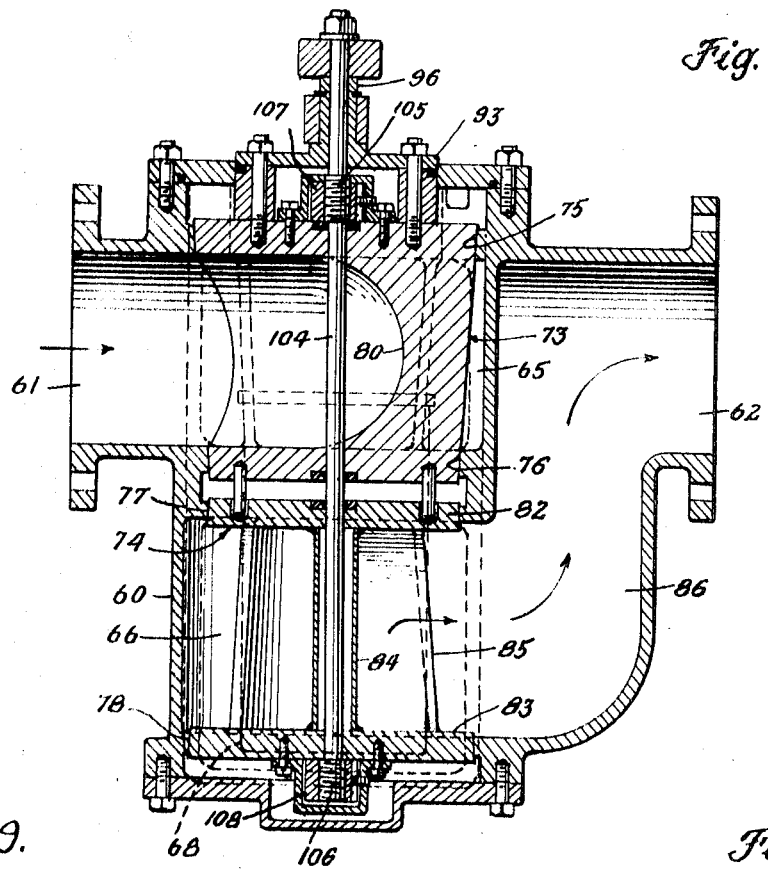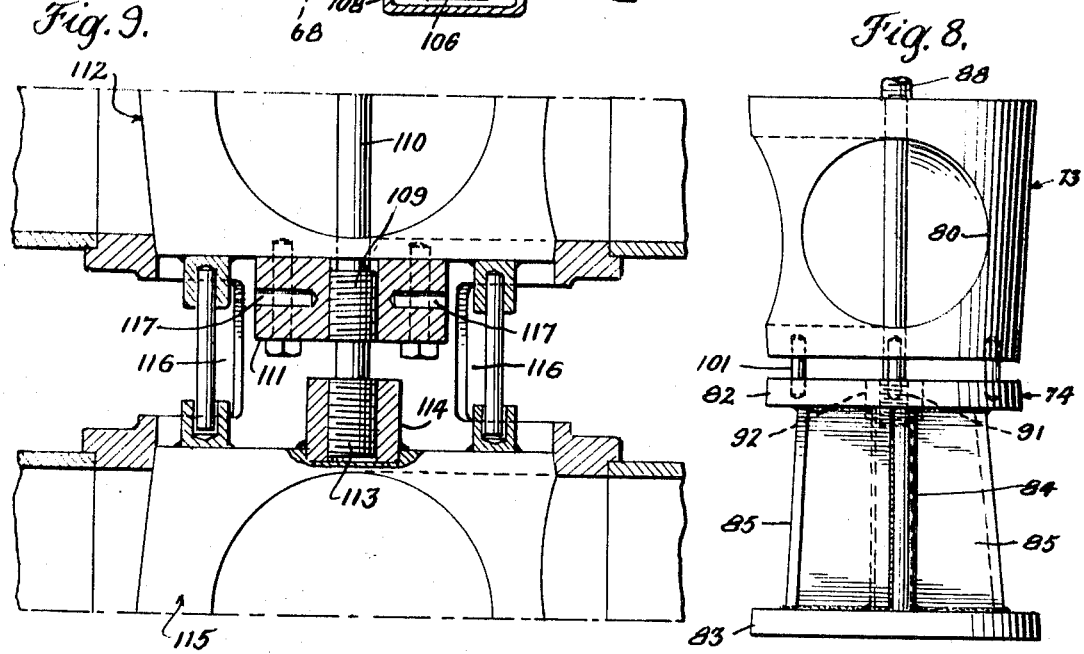

PLUG VALVE CONSTRUCTION AND OPERATING MECHANISM

This invention relates to valve construction and is particularly concerned with a multiple or duplex plug valve construction. Although various features of the invention are of wide applicability and are adapted for use with various fluids such as lubricating oil, fuel oil, diesel oil or salt water, one general type of use will serve for illustrative purposes, i.e., the use of the duplex valve construction of the invention for the purpose of alternatively diverting oil flow either through one channel or another, for instance through one filter or strainer or through another such filter or strainer. Such controllable oil straining systems are employed, for example, in connection with the lubrication of steam turbines used to drive generators for the production of electrical power. In some installations for which the equipment of the invention is adapted, the valve structure is submerged within the oil in a reservoir, and in other installations the valve structure though not submerged within the oil in a reservoir, is arranged to provide for diversion of both inlet and outlet flow of oil with respect to one filter ro strainer or another such filter or strainer. Typical uses of these kinds are illustrated in the drawings and described more fully herebelow, but it is to be understood that various features of the invention are of wide applicability and may be employed in various different fluid flow systems, especially where it is desired to provide for alternative diversion of the fluid flow through one channel or another, or provide for flow through both channels at the same time.

In considering one of the major objectives of the invention it is first pointed out that in valve constructions employing tapered valve plugs, as is herein contemplated, it is important to provide for unseating for the valve plugs before turning the plugs to an alternative position and further to provide for reseating of the valve plugs after the plugs have been turned to a new position. In the duplex arrangement of the present invention a pair of separate valve plugs are employed, these plugs being positioned in separate cavities. Accurate seating of the valve plugs in their respective cavities is important, and it is an object of the invention to provide for independent seating of the two valves so that the seating may be accurate, notwithstanding manufacturing inaccuracies in one valve or its cavity as compared with the other.

It is a further object of the present invention to provide a valve seating and unseating mechanism for a duplex valve arrangement in which a single-operating shaft is provided for effecting the independent seating of the two valve plugs.

Still another object of the invention is the provision of a valve arrangement of the kind above referred to including the seating and unseating mechanism providing for independent seating of the two valve plugs, with the parts arranged for used in a "submerged" type of valve installation, i.e., an installation in which the valve mechanism as a whole is submerged below the level of a liquid, such as a reservoir for oil. The invention provides common operating mechanisms for seating and unseating the valve plugs and also for turning the valve plugs, which operating mechanisms are extended upwardly from the submerged location of the valve to a point above the liquid level.

In another embodiment, the valve arrangement of the present invention is specially adapted for use in duplex strainer equipment in which the flow is diverted from one strainer to another, common operating mechanism being provided for seating and unseating the valve plugs.

In another aspect, the invention has as an important objective the provision of a duplex valve structure in which one or both of the valves is constructed with a flow passage of uniform cross sectional dimension or area, thereby avoiding expansion and contraction of the flow passage and minimizing pressure drop resulting from flow through the valve. The invention thus avoids expansion and contraction of the flow passage in an arrangement in which separate and separately seated valve plugs are employed, this being of especial importance in relatively large valves, for instance in valves 6 inches and larger, even up to about 16 inches. Moreover, the machining of separate small cavities for the separate valves is a simpler operation than the machining required for a single large cavity adapted to accommodate a double valve plug, and the seating of separate valve plugs is also easier than the seating of a single valve plug of large size, and here again these advantages are of especial importance in the larger valve sizes.

It is a further object of the invention to achieve the foregoing objectives and advantages in an arrangement in which it is not possible t completely shut off the flow when the valve is operated.

How the foregoing and other objects and advantages of the invention are attained will appear more fully from the following description referring to the accompanying drawings illustrating a preferred embodiment of the invention, and in which.

Figure 1:
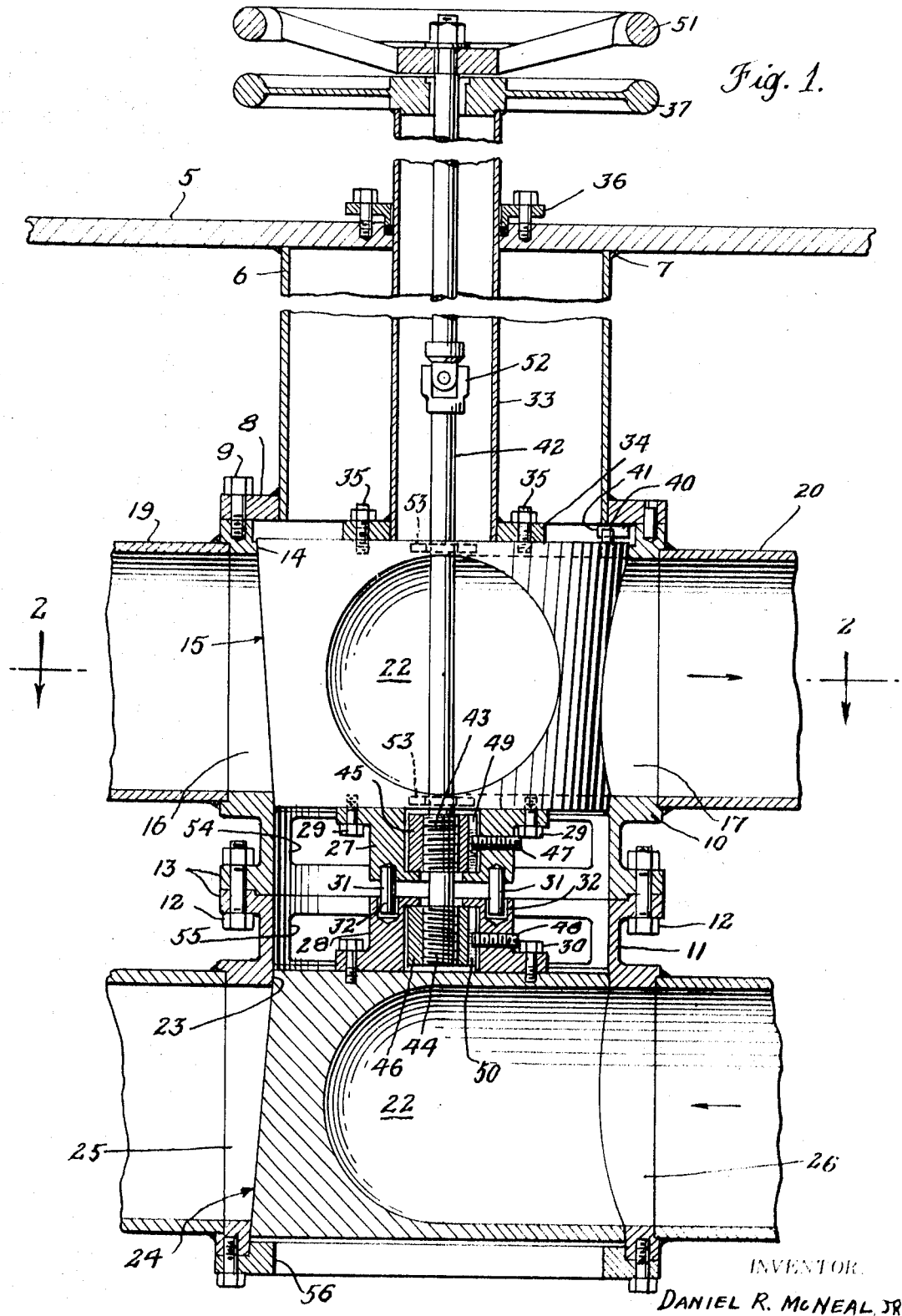
FIG. 1 is a vertical or axial sectional view, taken as indicated by the line 1-1 on FIG. 2, through a valve construction according to the invention, one of the two valve plugs of this embodiment being illustrated in elevation and the other being shown in vertical section.
Figure 2:
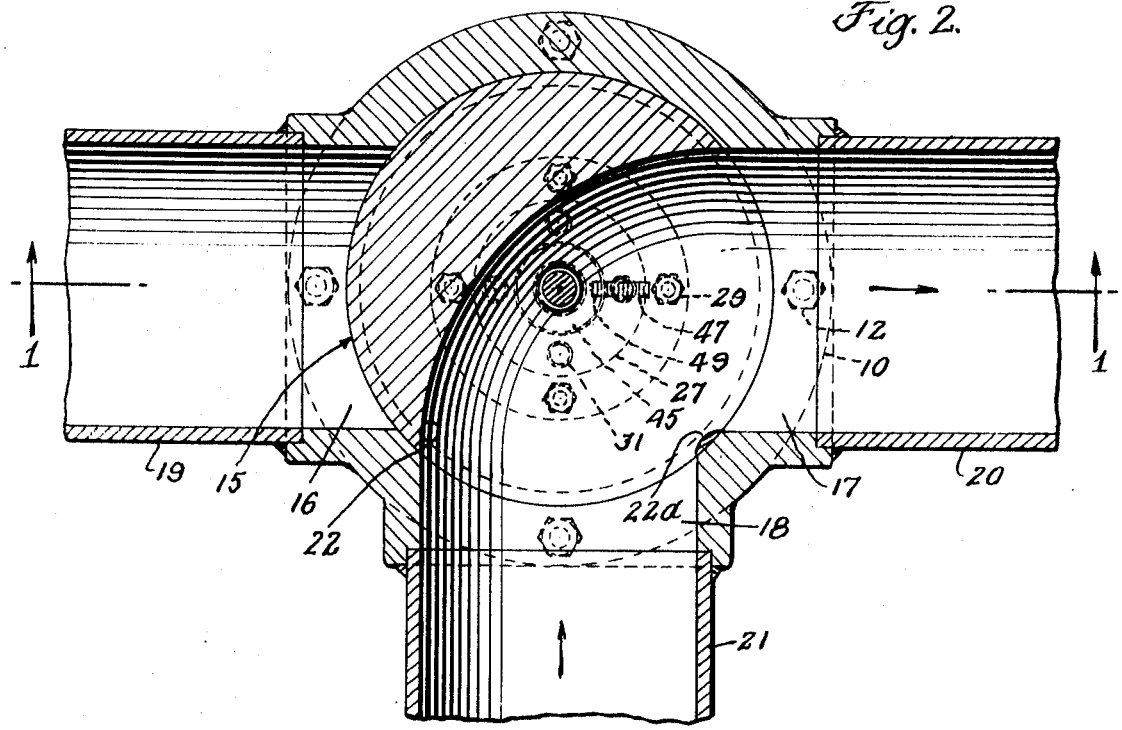
FIG. 2 is a sectional view taken as indicated by the line 2-2 on FIG. 1.
Figure 5:
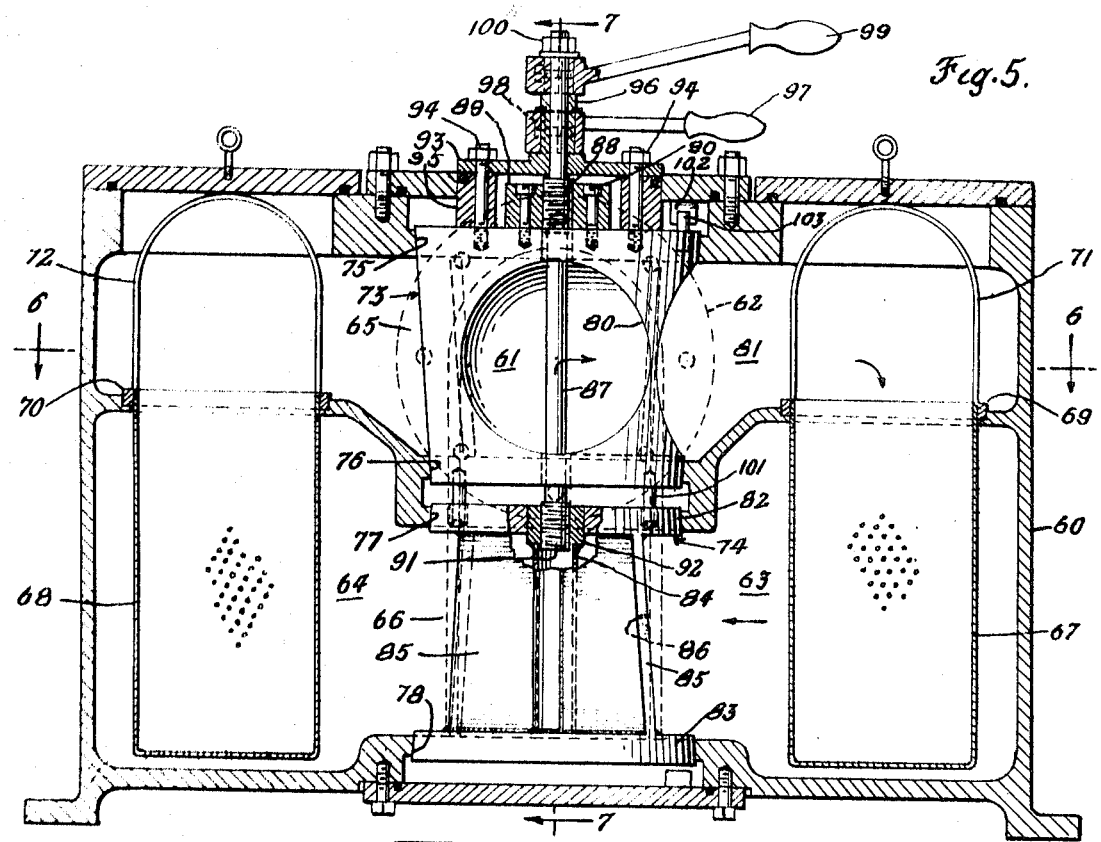
Figure 6:
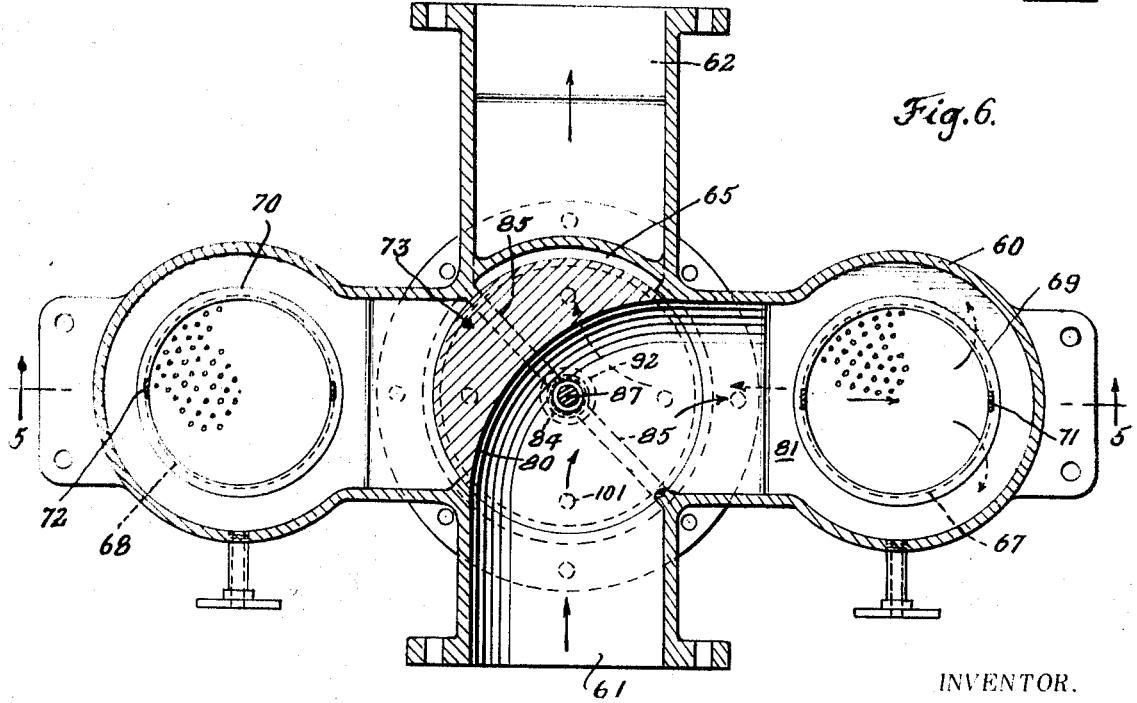

FIGS. 5 and 6 are views similar to FIGS. 1 and 2, but illustrating a valve arrangement constructed according to the invention associated with a duplex strainer and providing for alternative flow of oil or other fluid through either one of the two strainers, FIG. 5 being taken as indicated by the section line 5-5 on FIG. 6 and FIG. 6 being taken as indicated by the section line 6-6 on FIG. 5;

FIG. 7 is an axial sectional view of a duplex strainer arrangement similar to that shown in FIGS. 5 and 6, some parts being the same and others modified as will further appear, FIG. 7 being taken in general through the duplex stainer equipment in the direction indicated by the section line 7-7 on FIG. 5;

FIG. 8 is a view of the valve plugs shown in FIG. 5, but illustrating the plugs in elevation and separate from the enclosing casing; and FIG. 9 is a fragmentary view of an arrangement of the type shown in FIG. 1 but illustrating still another embodiment of the valve seating and lifting mechanism.

In FIG. 1 the reference numeral 5 indicates a plate or top closure of a tank presumed to be the top closure for an oil reservoir in which the valve construction of the embodiment illustrated is adapted to be submerged. The plate or deck 5 also serves as a means on which to mount or support the valve construction, a tubular supporting element 6 serving this purpose. This tube or sleeve 6 may be connected with the deck 5 as by welding indicated at 7. At its lower end the tubular support 6 carries a ring 8 from which the casing structure of the valve may be suspended, for instance by means of studs indicated at 9.

In the embodiment illustrated the casing structure includes two casing parts generally indicated at 10 and 11. Although these two casing parts need not necessarily be separately fabricated, for ease of machining it is convenient to form them separately, in which event they may be secured to each other in proper relative positions by bolts 12 cooperating with bolting flanges 13.

The casing part 10 is provided with a tapered cavity 14 adapted to receive the tapered valve plug 15. In the embodiment illustrated the casing part 10 has three ports 16, 17 and 18, the first two of which (see particularly FIG. 2) are arranged diametrically opposite to each other and the third of which (18) is angularly offset midway between the first two ports, i.e., at 90° from the common axis of the first two ports.

Figure 3:
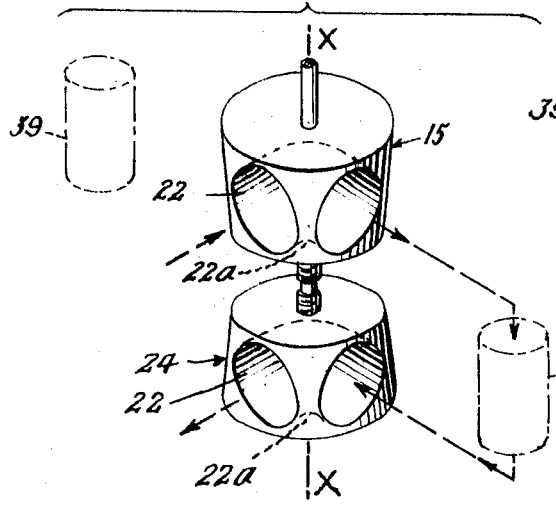
FIG. 3 is a diagrammatic view illustrating the flow through the valve construction with the valve plugs positioned as in FIGS. 1 and 2.

These ports in the valve casing part 10 provide for connection of end sections of pipe or conduit such as indicated at 19, 20 and 21. This arrangement reduces complexity when casting the casing part 10. The valve plug 15 is provided with a valve passage 22 in the shape of the passage in a 90° pipe elbow, this passage 22, with the valve plug positioned as shown in FIGS. 1, 2 and 3 providing for interconnection of the inlet or supply pipe 21 with the outlet pipe 20, and thus providing for fluid flow in the direction indicated by the arrows in FIGS. 1, 2 and 3.

In like manner, the valve casing part 11 is provided with a tapered valve cavity 23 for receiving the tapered valve plug 24. Also the casing part 11 is provided with three ports arranged similarly to the ports 16, 17 and 18 of the valve casing part 10, two of the ports of the casing 11 appearing in FIG. 1 at 25 and 26 in positions diametrically opposite to each other. None of the three ports of the casing part 11 appear in FIG. 2, because they all lie below the corresponding ports 16, 17 and 18 of the upper casing part 10.

The three ports of the valve casing 11 also serve for connection of end sections of pipes or conduits similar to those referred to above (19, 20 and 21) which are associated with the upper valve casing part 10.

In addition the valve plug 24 is provided with an interior valve passage 22 of the same kind as described above with reference to the valve plug 15. As with the upper portion of the valve structure, the ports and passages associated with the plug 24 are all of circular cross section and the interior valve passage 22 is in the form of the passage in a 90° pipe bend or elbow. These passage and port arrangements are of importance in minimizing pressure drop through the valve, because they eliminate either restriction or enlargement of the cross sectional flow area at any point between the fluid entrance to and the fluid exit from either section of the duplex valve.

The arrangement of the passages and ports described above is preferred where the inlet and outlet connections are on the same side of the structure, as in FIGS. 1 to 4.

Figure 4:
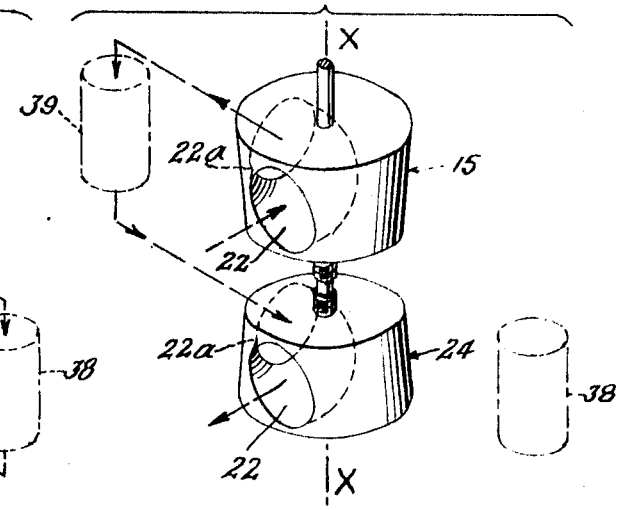
FIG. 4 is a diagrammatic view similar to FIG. 3 but illustrating the flow through the valve construction with the valve plugs adjusted to the alternative position provided.

It will be seen that the two tapered valve cavities and the two tapered valve plugs are aligned along a common axis, that axis being indicated at x-x in FIGS. 3 and 4. It will also be seen that the two valve cavities and the two valve plugs are so positioned along the common axis that the two valve plugs seat in the cavities by axial-seating movement in opposite directions. In the preferred embodiment illustrated, the two cavities and valve plugs are positioned with their smaller ends presented toward each other so that the valve plugs are seated by movement toward each other and are unseated by movement away from each other.

The two valve plugs are rotationally interconnected but have freedom for limited independent axial movement. This is accomplished by means of yokes 27 and 28, one of which (27) is connected with the valve plug 15 by means of bolts 29, and the other of which (28) is connected with the valve plug 24 by means of bolts 30. The two yokes 27 and 28 are spaced from each other and pints 31 are fastened in one of the yokes (27) and project into apertures 32 provided in the other yoke (28), the pins 31 having a loose fit in the aperture 32, so that the yoke and the valve plugs may approach toward and recede from each other while they are yet constrained to rotate together about the common axis x-x.

For effecting turning of the valve plugs a turning sleeve or tube 33 is connected with the upper valve plug 15 through a fastening flange 34 which is secured to the tube 33 and which is connected with the valve plug 15 by means of the studs 35. This tube 33 extends upwardly through the top deck 5 of the reservoir, a packing gland 36 being provided if desired where the tube passed through the deck. At its upper end the tube carries the handwheel 37 by means of which rotative motion may be imparted to the valve plug 15 and, because of the interengagement of the pins 31 in the apertures 32, also of the valve plug 24. This turning motion provides for alternative positioning of the two valve plugs either in the position indicated in FIG. 3 or in the position indicated in FIG. 4, these two positions being 90° offset from each other. Rotation of the valves may be limited by means of stop elements, for instance a stop pin such as shown at 40 in FIG. 1 which is secured to the valve plug 15 and which will engage an abutment 41 at one of the desired limits of rotative motion of the valves. A similar abutment may be provided in a position roughly 90° offset from the abutment 41 in order to establish a limit for the valve motion in the other direction.

In FIGS. 3 and 4 the diagrammatic outlines at 38 and 39 indicate devices such as oil filters or stainers (or any other equipment) through which it may be desired to alternatively direct the flow.

In this embodiment, for the purpose of seating and unseating the valve plugs, screwjack mechanism is positioned between the valve plugs in association with the yokes 27 and 28. This screw jack mechanism includes a central control shaft 42 having threaded portions 43 and 44. The threaded portion 43 cooperates with a nut 45 and the threaded portion 44 cooperates with a nut 46. The screw threads of the parts 43 and 45 are of opposite hand to the screw threads of parts 44 and 46, so that when the central control shaft 42 is rotated in one direction, the nuts 45 and 46 will be caused to move axially in opposite directions. The nuts 45 and 46 are restrained as against rotation by set screws 47 and 48 which are threaded into apertures in the yokes 27 and 28 and which project respectively into slots 49 and 50 extended axially in the outer surface of the nut parts 45 and 46. The nuts may therefore move axially with respect to the setscrews.

Attention is now called to the fact that the axial dimension of the nut part 45 is less than the corresponding internal dimension of the cavity within the yoke 27 in which the nut part 45 is received, so that the nut 45 has some freedom for axial movement with respect to the yoke 27 and thus with respect to the valve plug 15. The dimensional relationships are provided in connection with the nut part 46 and the yoke 28. Moreover, it is also preferred to provide some circumferential clearance around the nut elements 45 and 46 within the cavities in the yokes 27 and 28 in which the nut parts are received, thereby accommodating angular and parallel misalignment between the nuts and the valve plugs.

All of the foregoing dimensional relationships of the nut elements 45 and 46 and the yokes 27 and 28 are desirable in the operation of the lifting and seating mechanism. Thus, it will be seen that rotation of the central control shaft 42 in one direction will cause the two nut elements 45 and 46 to be drawn toward each other against the inturned lips of the yokes 27 and 28, thereby drawing the two valve plugs toward each other and securely seating the valve plugs in the tapered valve cavities of the casing parts 10 and 11. Analysis will show that this action utilizes the seating of each valve as a base of reaction for the seating of the other valve, while at the same time permitting some limited parallel or angular misalignment of the two valves. In this way minor manufacturing or machining inaccuracies are accommodated.

Moreover, the arrangement as described above makes possible the use of a single operating mechanism for effecting the independent seating of the two valves. Thus, with the control shaft 42 extended upwardly through the upper valve and connected with the handwheel 51 through the flexible joint 52, and further with the control shaft 42 mounted with freedom for limited axial motion, rotation of the handwheel 51 will cause the two nut elements 45 and 46 of the screwjack mechanism to concurrently seat the two valve plugs while at the same time permitting independence of seating of the two valves with respect to the positions of those valves in the separate cavities provided in the casing structure parts 10 and 11.

Although the control rod 42 traverses the elbow cavity 22 of the valve plug 15, this constitutes only such a minor obstruction that it has minimal influence on total valve pressure drop. Indeed the pressure drop through either the upper or the lower section of the valve is not substantially greater than that encountered as a result of fluid flow through a 90° pipe elbow. The valve plug 15 is provided with packings 53, 53 surrounding the control shaft 42.

From FIGS. 2, 3 and 4 it will be seen that formation of the interior plug passages 22 to substantially conform with the interior of a 90° pipe elbow may be arranged to leave a small bridging surface 22a which will seat in the valve cavity in the casing part in which the plug is received. The bridging surface is of advantage in machining, because it provides for continuous, rather than interrupted metal cutting.

It will be observed from FIG. 1 that the lower portion of the casing part 10 is apertured at 54 and that the upper portion of the casing part 11 is similarly provided with apertures such as indicated at 55. With a valve used in a submerged location in an oil reservoir, these apertures provide free access to bolts 29, 30 and pins 47, 48 and for the oil to reach the valve lifting and seating jack screw mechanism. The fact that this space or region around the jackscrew mechanism is exposed to the oil in the reservoir is thus of advantage and presents no undesirable problem even in the event of intercommunication between that space and the interior of the flow channels through the valve casing parts and the valve plugs when the plugs are lifted. This intercommunication occurs only during the short interval during which the valve plugs are lifted from their seats to permit turning of the plugs.

Similarly, access of the oil in the reservoir to the lower end of the valve plug 24 gives rise to no disadvantage, and the lower end of the casing part 11 may thus be provided with an open ring 56, which may serve as a support for the valve plug 24 when the plugs are unseated by operation of the handwheel 51.

From the foregoing it will be seen that the arrangement of FIGS. 1 to 4 not only provides for minimization of pressure drop through the duplex valve but also provides a simple operating element for seating and unseating the valves which may readily be extended from a submerged location to a suitable operating position above the liquid. The screwjack mechanism is also of special advantage in providing for independence of the seating action of the valves, even though both valves are caused to seat and unseat by actuation of a single control element. Still further the arrangement of FIGS. 1 to 4, with the clearances provided between the nuts 45 and 46 of the screwjack mechanism and the surrounding yokes 27 and 28, provides maximum freedom for compensation for inaccuracies or misalignments of valve seats or the plugs themselves.

In FIGS. 5 to 8 the duplex valve arrangement of the invention is shown as applied to a duplex strainer, providing for diversion of both the inlet and outlet flow from one strainer to the other.

Referring to FIGS. 5 to 8, the duplex strainer illustrated comprises in general a casing 60 having a fluid inlet 61, a fluid outlet 62, spaced side strainer chambers 63 and 64, an upper valve cavity 65 and a lower valve cavity 66; strainers or strainer baskets 67 and 68 suspended in the strainer chambers 63 and 64 be means of supporting rings 69 and 70 and having lifting handles 71 and 72; an upper tapered valve plug 73; a lower tapered valve plug 74; vertically spaced valve seats 75 and 76 for the upper valve plug 73; and vertically spaced valve seats 77 and 78 for the lower valve plug 74.

The upper valve plug 73 is provided with an elbow valve passage 80 similar to the elbow passages 22 of the valve plugs 15 and 24 of FIG. 1. The valve plug 73 in the position shown in FIGS. 5, 6 and 7, establishes communication from the fluid inlet 61 to the right hand chamber 81 located above the strainer chamber 63.

The lower valve plug 74 is of fabricated form consisting of an upper valve plate 82, a lower valve plate 83, a central connecting tube 84 welded to the plates 82 and 83, and vane members 85, 85 welded to the tube 84 and the upper and lower valve plates 82 and 83, which vane members have their outer edges tapered to correspond to the taper of the valve plates 82 and 83. With this lower valve plug in the position shown in FIGS. 5, 6 and 7 fluid flow is established from the strainer chamber 63 to the fluid outlet 62.

The fluid flow, with the valve plugs in the position above described, is clearly indicated by arrows in FIGS. 5, 6 an 7. On FIGS. 5 and 6 the arrows indicate the flow from the inlet 61 to the chamber 81, from there into the strainer or basket 67 through its open top, then out of the basket into the chamber 63, and thus as seen in FIGS. 6 and 7 through the lower valve plug 74 to the outlet 62 by way of the upright passage 86 (FIG. 7).

When the valve plugs are rotated 90° in clockwise direction as viewed in FIG. 6, fluid flow takes place through the left hand strainer on basket 68 from the inlet 61 to the outlet 62 in like manner to that described above.

As compared with the arrangement of FIGS. 1 to 4, it will be observed that in FIGS. 5 to 8 only the upper of the two valve plugs is provided with a passage of circular cross section in the form of a passage through a 90° elbow, the lower valve plug being somewhat differently constructed and including vanes 85, 85. This construction of the lower valve plug makes possible the diversion of the flow from the strainers to the outlet 62 of the casing which is arranged at the opposite side of the casing from the inlet 61, instead of at the same side as in the first embodiment (see particularly FIGS. 3 and 4). It should be understood that the valve lifting and seating mechanism provided in FIGS. 5 to 8, as well as in other figures, is adapted to be employed whether or not either or both of the valve plugs is provided with a passage in the form of the passage through a 90° elbow.

Although the general arrangement of the strainer including the flow passages and also the plug valve parts themselves are essentially the same in the embodiment of FIGS. 5, 6 and 8, as well as in the embodiment of FIG. 7, there are some differences in the valve lifting and seating mechanism in the arrangement of FIG. 7, as compared with the arrangement of FIGS. 5, 6 and 8. In the construction shown in FIG. 5 the central control shaft 87 is provided with upper threads 88 which cooperate with an adjustable nut 89 secured to the top of the upper valve plug 73 by screws 90 and with lower threads 91 of opposite hand which cooperate with a nut 92 secured in the top of the lower valve-plug 74 as by means of welding.

The upper end portion of the control shaft 87 extends through a bonnet 93 secured to the top of the valve plug 73 by means of bolts 94 and spacer ring 95. The bonnet 93 is provided with a neck 96 to which a valve turning handle 97 is secured by clamp 98. A valve lifting handle 99 is secured to the upper end of the control shaft 87 by a nut 100.

In assembling the valve structure shown in FIGS. 5 and 6 the lower valve plug 74 is inserted upwardly into the casing 60 and then the control shaft 87 is screwed into the nut 92 of the valve plug 74 to the position shown in FIG. 5. Next the upper valve plug 73 is inserted downwardly into the casing 60 and then the adjusting nut 89 is threaded on the control shaft 87 until both valve plugs fully seat in their valve seats. With the nut in this adjusted position the screws 90 are screwed in place to lock the nut to the valve plug 73. Next the spacer ring 95 is positioned on top of the valve plug 73 and the bonnet 93 is slipped onto the control shaft and screwed to the valve plug by the bolts 94 and finally the turning and lifting handles 97 and 99 are secured in place.

Turning of the lifting handle 99 will cause the valve plugs to move away from each other to unseat the valve plugs because of the opposite hand of the threads of the control shaft. The valve plugs then can be readily turned through 90° by the turning handle 97 in order to switch fluid flow from one strainer to the other. It is noted that the two valve plugs are connected to turn together by means of interengaging pins 101 of the general type indicated at 31 in FIG. 1 and described above. Suitably positioned stop lugs 102 and pins 103 limit the rotative movement of the valve plugs for proper registry of the valve plugs in their 90° positions.

Referring now to FIG. 7 it will be seen that in this embodiment the control shaft 104 extends through both valve plugs and is provided with upper threads 105 and lower threads 106 of opposite hand cooperating with nuts 107 and 108 of the character of the nuts described above in connection with FIGS. 1 to 4, but in FIG. 7 the screw jacks are arranged above and below the two valve plugs, instead of between them. In this connection it is to be noted that this construction is advantageous for use in duplex valves of the type described in connection with FIGS. 1 to 4 in which the vertical spacing between the valve plugs is too small to accommodate nut devices therebetween in the manner shown in FIG. 1.

FIG. 9 illustrates a modification in which the screw threads 109 of the control shaft 110 cooperate with an adjustable nut 111 secured to the upper valve plug 112 and in which the screw threads 113 cooperate with a nut 114 welded to the lower valve plug 115. Access to the adjustable nut 111 is obtained through suitable openings 116, 116 in the casing. Adjustment of the nut before screwing it in place can be made by inserting a pin in the holes 117 of the nut. Through this arrangement the screw thread and nut construction described in connection with FIG. 5 can be employed in the vertical space between the valve plugs.

It will be observed that the arrangements of FIGS. 5, 6 and 8 and also of FIG. 9 are exceedingly simple from the standpoint of the screwjack mechanism employed. Even though no special provision is made for lateral or axial adjustment movement of one screwjack with relation to the other, in large size valve structure, some flexibility of the screwjack may be relied upon to compensate for minor inaccuracies in alignment of the valves.

In connection with the threads of the control shafts it is pointed out that they are sufficiently fine so that several turns of the control shaft are required to lift the plugs clear of their seats. Thus, even if there should be a tendency for the nuts to creep on the threads when turning the plugs this would not cause seating of the plugs during the 90° of their rotation.

I claim:

1. A duplex valve construction comprising casing structure having a pair of valve plug cavities tapered in opposite directions each having valve ports in the casing structure, a tapered valve plug seating in each valve cavity and having a valve passage and being angularly movable between different positions for controlling the flow between cavity ports, and tapered cavities and tapered plugs being aligned along a common axis, means connected to the plugs to seat the plugs in the cavities by axial seating movement in opposite directions, the means for moving the valve plugs in their seating directions including adjustable means providing for seating of each plug by reaction against the other plug.

2. A valve construction as defined in claim 1 in which the valve seating means comprises threaded nut and screw jack devices of opposite thread hand interconnecting the valve plugs, and an operating shaft connected to said jack devices and rotative about the common axis of the valve plugs.

3. A duplex valve construction comprising casing structure having a pair of tapered valve plug cavities each having valve ports in the casing structure, a tapered valve plug in each valve cavity having a valve passage and being angularly movable between different positions for controlling the flow between cavity ports, the tapered cavities and tapered plugs being aligned along a common axis and having their smaller ends presented toward each other so that the two valves seat in the cavities by axial seating movement in directions toward each other, and means connected to the valve plugs for moving the valve plugs toward each other to seat the plus in the cavities including adjustable means providing for seating of each plug by reaction against the other plug.

4. A duplex valve construction comprising casing structure having a pair of tapered valve plug cavities each having valve ports in the casing structure, a tapered valve plug in each valve cavity having a valve passage and being angularly movable between different positions for controlling the flow between cavity ports, the tapered cavities and tapered plugs being alignment along a common axis and having their smaller ends presented toward each other so that the two valves seat in the cavities by axial seating movement in direction toward each other, and means connected with the valve plugs for moving the valve plugs toward each other to seat the plugs in the cavities including screw jack means having cooperating screw threaded parts relatively rotatable about said common axis of the valve plugs and positioned and reacting between the valve plugs to effect seating thereof.

5. A valve construction as defined in claim 4 in which parts of the screwjack means are mounted with freedom for movement transversely of said common axis to accommodate misalignment of the valve plug cavities and valve plugs with respect to each other or with respect to said common axis.

6. A valve construction as defined in claim 4 and further including an operating shaft for the screwjack means, the shaft being positioned coaxially of said common axis of the valve plugs.

7. A duplex valve construction comprising casing structure having a pair of tapered valve plug cavities each having valve ports in the casing structure, a tapered valve plug in each valve cavity having a valve passage and being angularly movable between different positions for controlling the flow between cavity ports, the tapered cavities and tapered plugs being aligned along a common axis and having their smaller ends presented toward each other so that the two valves seat in the cavities by axial seating movement in directions toward each other, means connected with the valve plugs for seating and lifting the valve plugs comprising, for each plug, a screwjack device having a screw part and a nut part, the screw parts of the two devices being interconnected and rotatable about said common axis of the valve plugs, the screw jack devices for the two valve plugs having screw threads of opposite hand, and for each valve plug means connected therewith for restraining rotation of the associated nut part of the screw device with respect to the valve plug and abutment means also fixed with respect to the valve plug and against which the nut part reacts axially of the valve plug to effect seating or unseating of the valve plug.

8. A valve construction as defined in claim 7 in which the abutment means for each valve plug comprises abutment surfaces spaced from each other at opposite ends of the associated nut part, the spacing being sufficient to provide limited movement of the nut part without moving the valve plug and thereby provide for independent seating of the two valve plugs.

9. A valve construction comprising casing structure having a tapered valve plug cavity, with three valve ports in the casing structure two of which ports are located diametrically opposite to each other and the third is located midway between the first tow ports, each of said ports being of circular cross section and of substantially the same diameter, a tapered valve plug in the valve cavity having a valve passage therethrough of the shape of the passage in a 90° pipe elbow and of substantially the same inside diameter as that of the valve ports, the valve plug being angularly movable between positions interconnecting said third port with either of said first two ports, and means connected with the valve plug for seating and unseating the valve plug in the valve cavity in the casing structure.

10. A duplex valve construction comprising casing structure having pair of axially aligned tapered valve plug cavities each having three valve ports in the casing structure with two of the ports located diametrically opposite to each other and with the third port located midway between the first two ports, each of said ports being of circular cross section and of substantially the same diameter, a tapered valve plug in each valve cavity each having a valve passage therethrough of the shape of the passage in a 90° pipe elbow of substantially the same inside diameter as that of the valve ports, the valve plugs being angularly movable between positions interconnecting said third port with either of said first two ports, and means connected with the valve plugs for concurrently moving the two valve plugs between said positions.

11. A valve construction as defined in claim 10 and further including means connected with the valve plugs for concurrently unseating both valve plugs and for concurrently seating both valve plugs.

12. A duplex valve construction comprising casing structure having a pair of tapered valve plug cavities each having valve ports in the casing structure, a tapered valve plug in each valve cavity having a valve passage and being angularly movable between different positions for controlling the flow between cavity ports, the tapered cavities and tapered plugs being aligned along a common axis and being so positioned along said common axis that the two valves seat in the cavities by axial seating movement in opposite directions, and means connected with the valve plugs for moving the valve plugs in their seating directions including threaded nut and screwjack devices associated with the valve plugs.

13. A valve construction as defined in claim 12 in which the screwjack devices are located between the valve plugs, and an operating shaft for said jack devices rotative about the common axis of the valve plugs and extended from the region between the valve plugs through one of said plugs.

14. A valve construction as defined in claim 12 in which the screwjack devices are located adjacent the remote ends of the valve plugs, and an operating shaft for said jack devices is extended through the valve plugs and interconnects the screws of said devices.

15. A valve construction as defined in claim 12 in which the screw jack devices are located one intermediate the two valve plugs and the other at the outer end of one of the valve plugs.